(12) United States Patent
Stander et al.

(10) Patent No.: US 11,505,086 B2
(45) Date of Patent: Nov. 22, 2022

(54) VEHICLE SPEED CONTROL SYSTEM AND METHOD OF CONTROLLING RETARDATION ENERGY OF A VEHICLE

(71) Applicant: DEERE & COMPANY, Moline, IL (US)

(72) Inventors: Francois Stander, Dubuque, IA (US); Sean P. West, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 724 days.

(21) Appl. No.: 16/505,006

(22) Filed: Jul. 8, 2019

(65) Prior Publication Data

US 2021/0009003 A1    Jan. 14, 2021

(51) Int. Cl.
| | |
|---|---|
| *B60L 58/12* | (2019.01) |
| *B60L 3/00* | (2019.01) |
| *B60W 20/13* | (2016.01) |
| *B60L 50/15* | (2019.01) |

(52) U.S. Cl.
CPC ............. *B60L 58/12* (2019.02); *B60L 3/0046* (2013.01); *B60L 50/15* (2019.02); *B60W 20/13* (2016.01); *B60L 2240/36* (2013.01); *B60L 2240/425* (2013.01); *B60L 2240/485* (2013.01); *B60L 2240/545* (2013.01)

(58) Field of Classification Search
CPC .......... B60L 7/10; B60L 3/0046; B60L 50/15; B60L 2240/425; B60L 58/12; B60W 10/196; B60W 2510/244; B60W 30/18127; B60W 2050/009; B60W 10/08; B60W 20/13; Y02T 10/70; B60Y 2300/89
See application file for complete search history.

(56) References Cited

U.S. PATENT DOCUMENTS

| | | | |
|---|---|---|---|
| 8,386,109 B2 | 2/2013 | Nicholls | |
| 8,612,074 B2 | 12/2013 | Minarcin et al. | |
| 2010/0059300 A1* | 3/2010 | Brown | B60L 50/66 74/504 |

(Continued)

FOREIGN PATENT DOCUMENTS

| | | | | |
|---|---|---|---|---|
| DE | 19947922 A1 * | 4/2001 | | B60K 6/48 |
| DE | 19947922 A1 | 4/2001 | | |

(Continued)

OTHER PUBLICATIONS

German Search Report issued in counterpart application No. 102020207297.3 dated Nov. 11, 2020 (10 pages).

*Primary Examiner* — Jared Fureman
*Assistant Examiner* — Duc M Pham

(57) ABSTRACT

A speed control system to control retardation energy of a vehicle and a method of controlling retardation energy of a vehicle are provided. The system includes an energy storage device configured to absorb and store the retardation energy of the vehicle. The energy storage device includes a power absorption limit determined at least partially by a temperature and a state of charge of the energy storage device. The system further includes a non-energy-storing retarder configured to absorb the retardation energy of the vehicle and a controller configured to route the retardation energy to the energy storage device up to the power absorption limit and route a remaining portion of the retardation energy to the non-energy-storing retarder.

19 Claims, 5 Drawing Sheets

(56) References Cited

U.S. PATENT DOCUMENTS

| | | | |
|---|---|---|---|
| 2011/0276243 A1* | 11/2011 | Minarcin | B60W 10/08 701/70 |
| 2017/0217328 A1 | 8/2017 | Patel | |
| 2017/0253127 A1* | 9/2017 | Ciaccio | B60L 58/13 |
| 2018/0079318 A1 | 3/2018 | Ha et al. | |

FOREIGN PATENT DOCUMENTS

| | | |
|---|---|---|
| DE | 102004025830 A1 | 8/2006 |
| DE | 102013223409 A1 | 5/2015 |
| EP | 2748044 B1 | 1/2018 |
| WO | 2018113962 A1 | 6/2018 |

\* cited by examiner

VEHICLE SPEED CONTROL SYSTEM AND METHOD OF CONTROLLING RETARDATION ENERGY OF A VEHICLE

BACKGROUND

Vehicle speed may be controlled through various mechanisms, including brakes and other retarding devices. Brakes and retarders may be used to slow a vehicle or prevent acceleration, such as during descending movement of a vehicle down a slope. Conventional brakes and retarders may waste energy as the vehicle's kinetic and/or gravitational energy is converted to heat using such conventional braking or retarding devices as engine brakes, service brakes, transmission retarders, or electrical retarders.

SUMMARY

Various aspects of examples of the present disclosure are set out in the claims.

In accordance with an embodiment of the present disclosure, a speed control system to control retardation energy of a vehicle is provided. The system includes an energy storage device configured to absorb and store the retardation energy of the vehicle and having a power absorption limit determined at least partially by a temperature and a state of charge of the energy storage device, a non-energy-storing retarder configured to absorb the retardation energy of the vehicle, and a controller configured to route the retardation energy to the energy storage device up to the power absorption limit and route a remaining portion of the retardation energy to the non-energy-storing retarder.

The non-energy-storing retarder may include an uncooled retarder. The uncooled retarder may include an engine brake and/or an electrical retarder. The uncooled retarder has an uncooled retarder absorption limit, the controller may be configured to route the retardation energy to the uncooled retarder up to the uncooled retarder absorption limit. The system may include a second non-energy-storing retarder configured to absorb the retardation energy of the vehicle, the controller may be further configured to route a third portion of the retardation energy to the second non-energy-storing retarder. The second non-energy-storing retarder may include a cooled retardation device. The cooled retardation device may include a transmission retarder and/or a friction brake. The controller may be configured to prioritize absorption of the retardation energy of the vehicle by routing the retardation energy in the order of the energy storage device, the non-energy-storing retarder, and the second non-energy-storing retarder.

In accordance with an embodiment of the present disclosure, a method of controlling retardation energy of a vehicle is provided. The method includes determining a state of charge of an energy storage device of the vehicle, determining a temperature of the energy storage device of the vehicle, determining a power absorption limit of the energy storage device based on the temperature of the energy storage device and the state of charge of the energy storage device, absorbing a first portion of the retardation energy with the energy storage device up to the power absorption limit, and absorbing a second portion of the retardation energy with a non-energy-storing retarder.

Absorbing the second portion of the retardation energy may include absorbing the second portion of the retardation energy with an uncooled retarder. Absorbing the second portion of the retardation energy with the uncooled retarder may include absorbing the second portion of the retardation energy with an engine brake and/or an electrical retarder. Absorbing the second portion of the retardation energy with the uncooled retarder may include absorbing the second portion of the retardation energy with the uncooled retarder up to an uncooled retarder absorption limit. The method may further include absorbing a third portion of the retardation energy with a second non-energy-storing retarder. Absorbing the third portion of the retardation energy with the second non-energy-storing retarder may include absorbing the third portion of the retardation energy with a cooled retardation device. Absorbing the third portion of the retardation energy with the cooled retardation device may include absorbing the third portion of the retardation energy with a transmission retarder and/or a friction brake. The method may include prioritizing absorption of the retardation energy of the vehicle in the order of the energy storage device, the non-energy-storing retarder, and the second non-energy-storing retarder. The method may further include determining the retardation energy as a desired retardation of the vehicle during movement of the vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 5 of the drawings.

Figure 1:
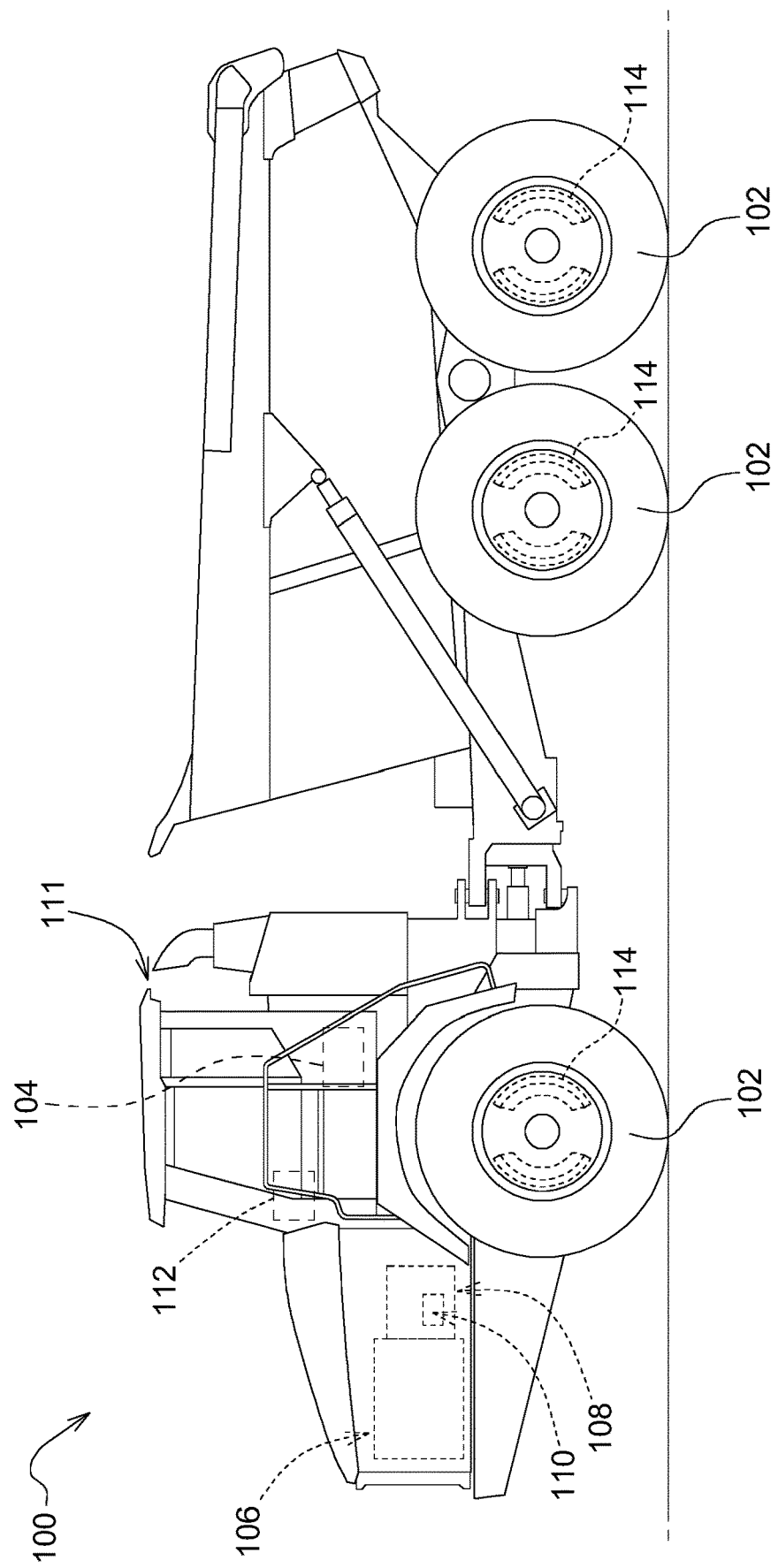
FIG. 1 illustrates a vehicle in accordance with an embodiment of the present disclosure.

FIG. 1 illustrates a vehicle 100 in accordance with an embodiment of the present disclosure. The vehicle 100 in the illustrated embodiment is an articulated dump truck having wheels 102, a controller 104, an engine 106 (e.g., a diesel engine), a transmission 108, a retarder 110, an operator cab 111, an operator interface 112, and service brakes 114. As used herein, the retarder 110 may include multiple or a single hydraulic, hydrodynamic, or transmission retarder and/or an electrical retarder, such as an eddy current retarder to name a non-limiting example. However, a retarder, as the term is used throughout the present disclosure, includes and may refer to any type of retarder or retarding device, including without limitation one or more braking devices, such as a service brake or other friction brake and/or an engine brake or exhaust brake.

The vehicle 100 of one or more embodiments includes any vehicle configured or designed for off-road or on-road use, including, in one non-limiting set of examples, a vehicle used for construction, agriculture, forestry, or mining. Vehicle 100 is illustrated as an articulated dump truck in FIG. 1, but the vehicle 100 may also be, in non-limiting examples, a backhoe loader, crawler, excavator, feller buncher, forwarder, harvester, knuckleboom loader, motor grader, scraper, skidder, skid steer loader, track loader, or other truck or vehicle. Vehicle 100 of the illustrated embodiment engages the ground through six wheels 102, which support vehicle 100 on the ground, but alternative embodiments may include alternate ground engaging components such as tracks.

Figure 2:
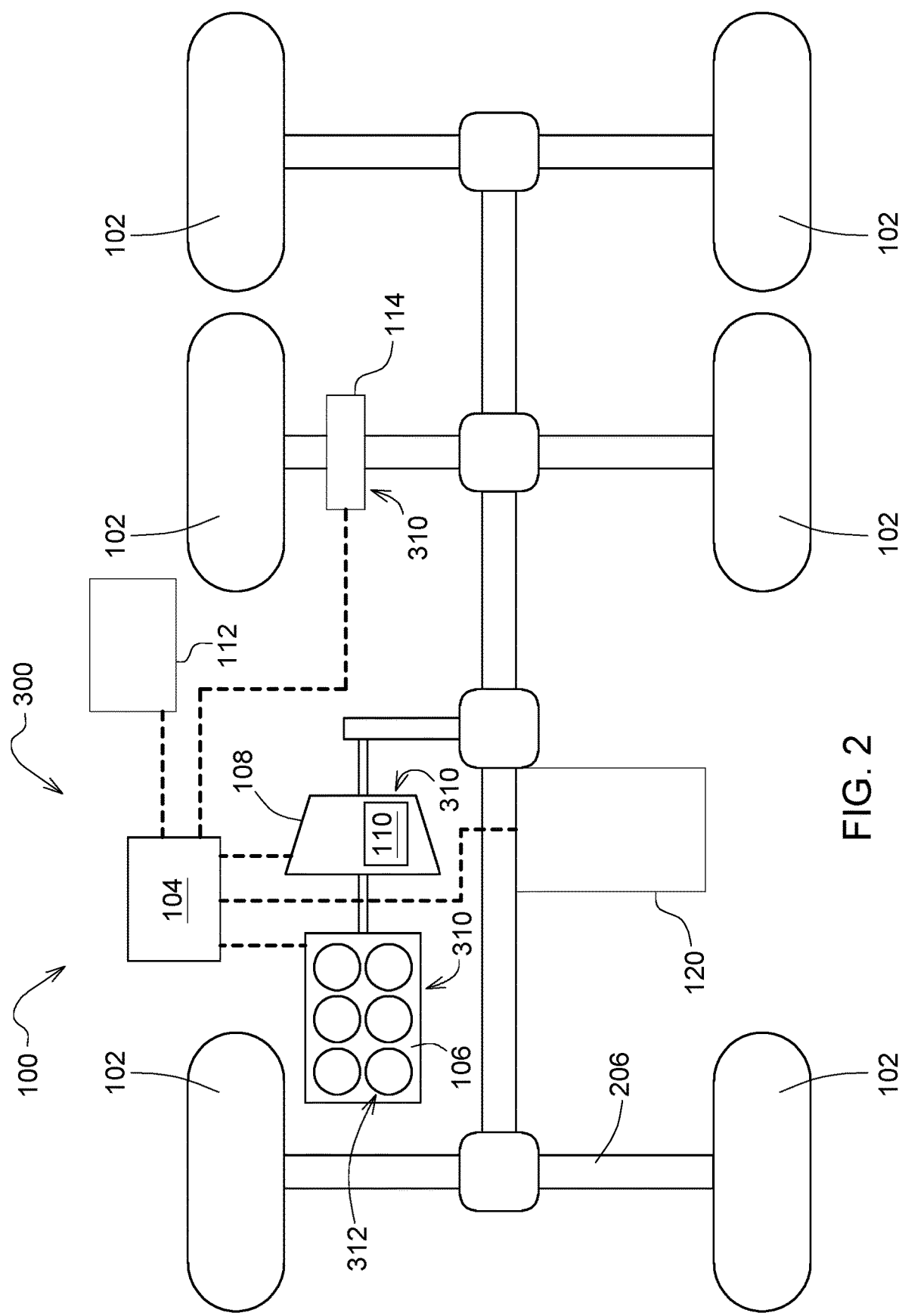
FIG. 2 is a schematic view of a vehicle control system in accordance with an embodiment of the present disclosure.

Referring now to FIG. 2 with continuing reference to FIG. 1, the transmission 108 of the illustrated embodiment is a multi-speed mechanical transmission operatively coupled to engine 106 and operatively coupled to wheels 102 through intermediate drivetrain components such as a driveshaft, differential, axle, and final drive. Alternative embodiments may use different transmission types, including other types of multi-speed transmission (i.e., transmissions with a modifiable output speed to input speed ratio) such as hydraulic transmissions, continuously variable transmissions, and infinitely variable transmissions. Retarder 110 of the illustrated embodiment is a hydraulic retarder and may also be referred to as a hydrodynamic retarder, which has been integrated into transmission 108 and thus may be called a transmission retarder. Alternative embodiments may use different retarder types, such as an engine brake retarder, exhaust brake retarder, or electric retarder (e.g., an eddy current retarder). In particular embodiments, multiple retarders and retarder types may be utilized to absorb retardation energy of the vehicle 100. When retarder 110 is disengaged, it does not provide hydraulic drag or retarding force except for minor effects such as windage losses. When retarder 110 is engaged, such as upon a command from controller 104 to engage, it provides hydraulic drag opposing the rotation of components in the drivetrain of vehicle 100. This hydraulic drag results in a retarding force which tends to slow vehicle 100, or a negative torque. The amount of hydraulic drag produced by retarder 110 may be varied, thereby allowing retarder 110 to achieve a variable retarding force.

The controller 104 shown in FIGS. 1 and 2 includes a microprocessor operatively coupled with memory and input/output circuitry. Controller 104 is in electrical communication with engine 106, retarder 110, and operator interface 112, among other components, such that it may receive signals from these components or send signals to these components. Each component may be directly operatively coupled to controller 104 (e.g., through a wiring harness or radio transceivers) or indirectly operatively coupled to controller 104 (e.g., through intermediate components such as other controllers), but in any event electrical signals may be communicated between controller 104 and the component. The intermediate components may pass electrical signals between controller 104 and the component without modification or may process such signals.

An operator cab 111, as shown in FIG. 1 provides a station for an operator to control vehicle 100, and includes the operator interface 112, a brake pedal, a steering wheel, an accelerator pedal, and other operator inputs such as switches and buttons to activate and deactivate certain features. An operator utilizes operator inputs to control movement of the vehicle 100. In some embodiments, a vehicle command may be issued or modified by the controller 104 on vehicle 100, such as one configured to manage vehicle speed (e.g., retardation control, cruise control, speed limiters), traction (e.g., limited slip traction control), or vehicle operation (e.g., global positioning system (GPS) guided autonomous or semi-autonomous operation). The operator interface 112 includes one or more retardation control functions, including, without limitation, a descent control switch, configured to control speed or retardation as the vehicle 100 descends down a slope, retarder increase and decrease switches to increase or decrease the amount of retardation energy controlled by the vehicle 100. In an embodiment, the operator of the vehicle 100 may control retardation of the vehicle 100 via the operator interface 112.

Service brakes 114, as shown in FIGS. 1 and 2 may be conventional friction brakes, such as disc (wet or dry) brakes integrated into an axle. While service brakes 114 may be utilized to slow or stop vehicle 100, such usage causes wear on a friction braking system and generates local heat at the brakes. Such wear may be undesirable as it may result in costs for servicing or replacing brake components. Generating local heat at service brakes 114 may be undesirable for multiple reasons. First, the heat generated by service brakes 114 may be rejected to the environment, which requires cooling components such as heatsinks or cooling circuits. Second, the heat generated by using service brakes 114 may cause brake fade and reduce the performance of service brakes 114. Using service brakes 114 on a routine basis, such as on a vehicle operating nearly continuously at a work site, or heavy usage of service brake 114 over a short period of time, such as slowing vehicle 100 when it is loaded and descending a hill, may cause significant wear and generate significant amounts of heat. Using a retarder in these applications may reduce service brake wear and better dissipate heat generated and may allow for less complex or costly brake design, avoid brake maintenance, and avoid brake fade.

FIG. 2 further illustrates a control system 300 for controlling vehicle speed or retardation energy. As shown in FIG. 2, the system 300 and the vehicle 100 of the illustrated embodiment further includes an energy storage device 120. In one or more embodiments, the energy storage device 120 is configured to absorb and store retardation energy of the vehicle 100. The energy storage device 100 may include one or more batteries, capacitors, accumulators, and/or other component configured to store energy.

Figure 3:
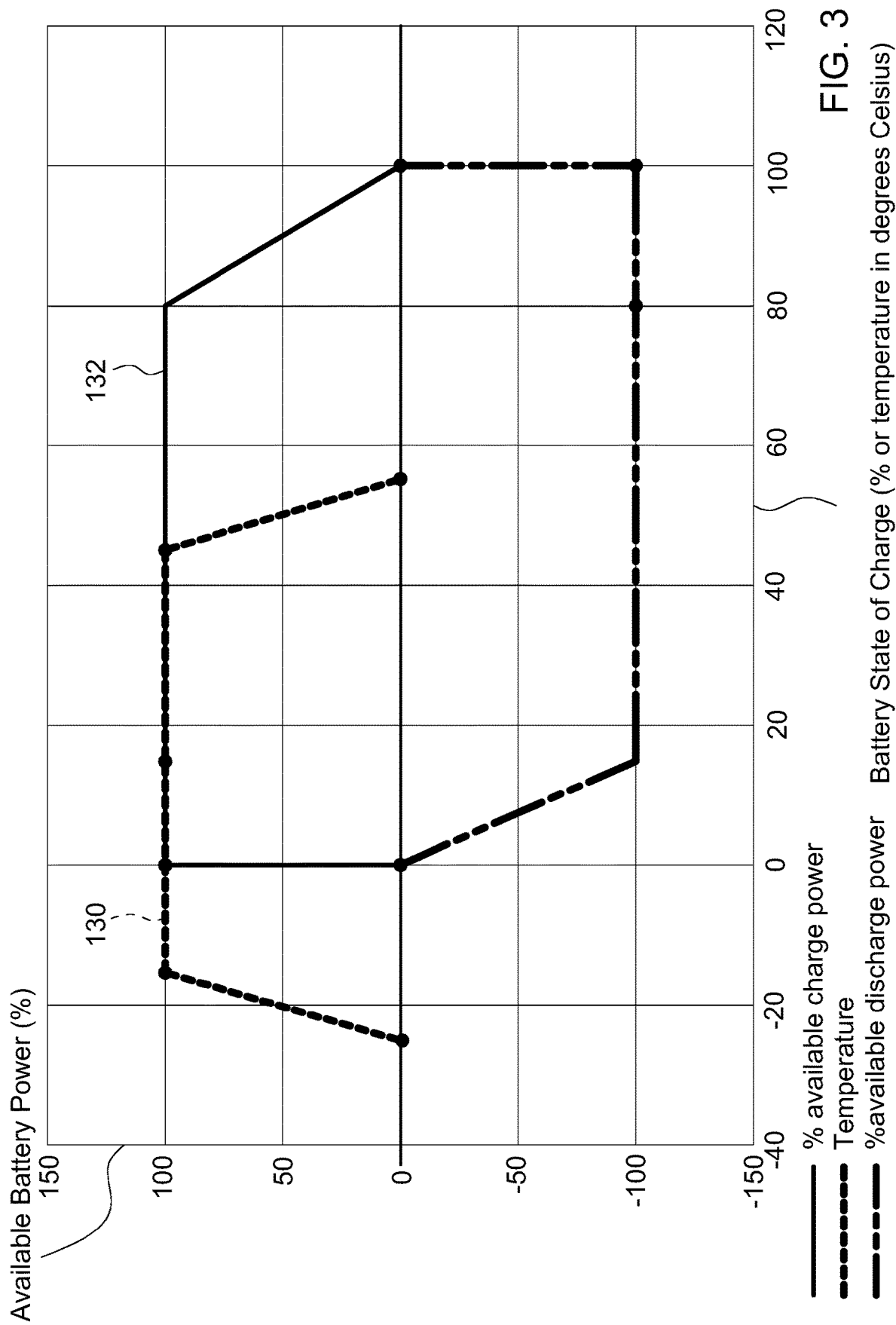
FIG. 3 is a chart showing energy storage device power in accordance with an embodiment of the present disclosure.
Figure 4:
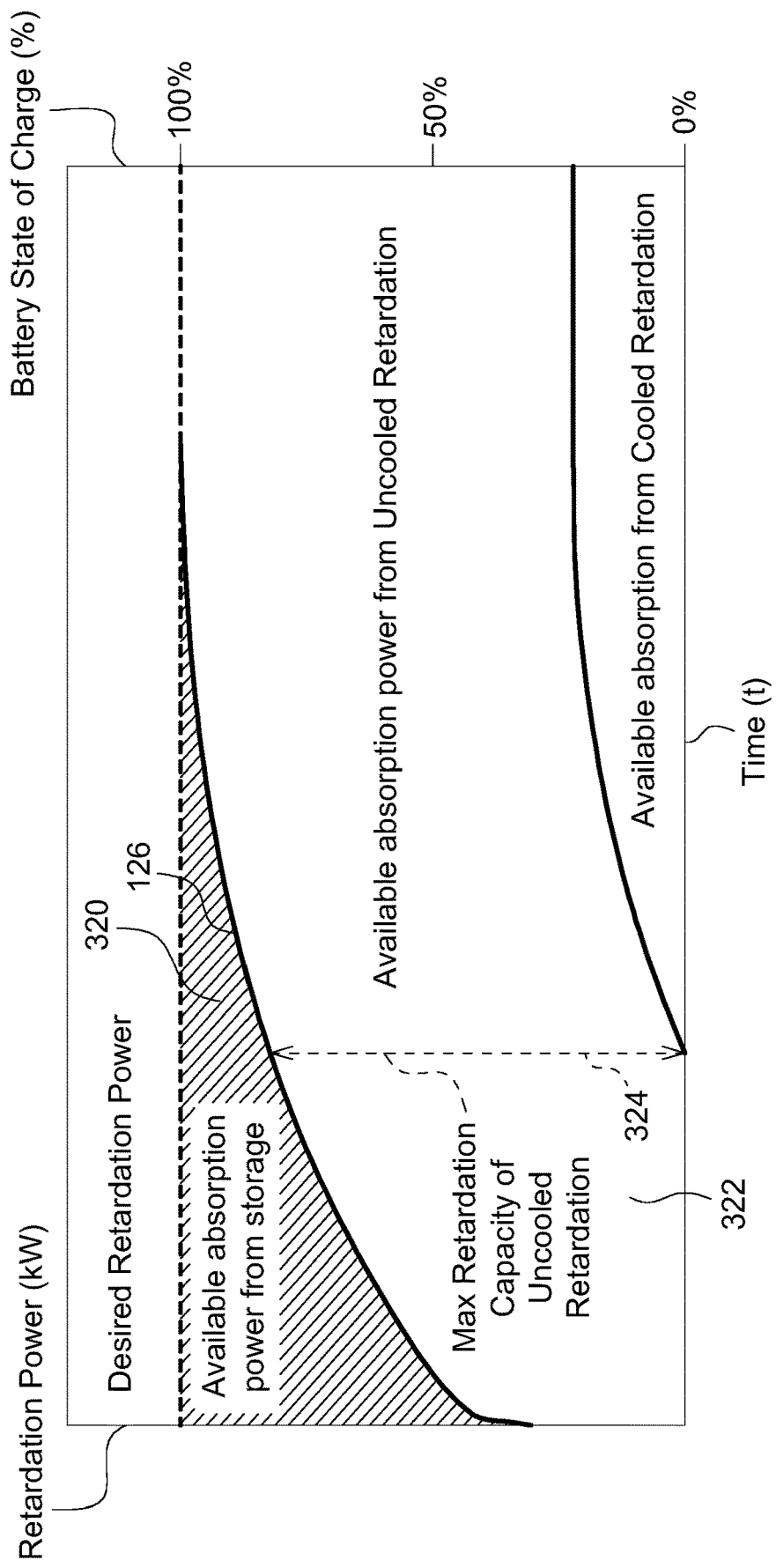
FIG. 4 is a chart showing retardation power over time in accordance with an embodiment of the present disclosure.

FIG. 3 is a chart illustrating available charging or absorption from the energy storage device 120 relative to a state of charge 122 of the energy storage device 120 and a temperature 124 of the energy storage device 120. FIG. 4 is a chart illustrating the retardation energy absorbed with the system 300 over time. The system 300 illustrated in FIG. 2 includes the energy storage device 120 configured to absorb and store retardation energy of the vehicle 100. In additional embodiments, the vehicle 100 and/or the system 300 includes multiple energy storage devices 120. The energy storage device 120 includes a power absorption limit 126 shown further in FIG. 4. The power absorption limit 126 of the energy storage device 120 is determined at least partially by the temperature 124 of the energy storage device 120 and the state of charge 122 of the energy storage device 120 as shown by lines 130, 132 in FIG. 3.

Referring to the chart of FIG. 4, the retardation energy is shown along the Y-axis as retardation power in kilowatts. The system 300 of an embodiment further includes a non-energy-storing retarder 310 configured to absorb the retardation energy of the vehicle 100. The non-energy-storing retarder 310 may include any retarder configured to absorb braking or retardation energy but not store such energy, such as, in non-limiting examples, one or more of the retarder 110, the engine brake 312 of the engine 106, and exhaust brake (not shown), the service brake 114 or another friction brake, an electrical retarder, and/or another retarding or braking device.

The system 300 includes the controller 104 configured to route the retardation energy, or at least a first portion 320 of the retardation energy, to the energy storage device 120 up to the power absorption limit 126. The controller 104 of the system 300 is further configured to route a remaining or second portion 322 of the retardation energy, or the portion not routed to the energy storage device 120, to the non-energy-storing retarder 310. In an additional embodiment, the non-energy storing retarder 310 includes multiple non-energy storing retarders 310, such that the controller 104 of the system 300 is further configured to route the remaining portion 322 of the retardation energy, or the portion not routed to the energy storage device 120, to a first of the non-energy-storing retarder 310, a second non-energy-storing retarder 310, and, in additional embodiments, a third non-energy-storing retarder 310. The system 300 may include any number of energy-storing or non-energy-storing retarders 310 in accordance with the operation of the embodiments described herein. The system 300 of an embodiment is configured to prioritize absorption of the retardation energy of the vehicle 100 by routing the retardation energy in the order of the energy storage device 120, the non-energy-storing retarder 310, and the second non-energy-storing retarder. In a further embodiment, the system 300 is configured to prioritize absorption of the retardation energy of the vehicle 100 by routing the retardation energy in the order of the energy storage device 120, the non-energy-storing retarder 310, the second non-energy-storing retarder 310, and any additional non-energy-storing retarders.

Referring to FIG. 4 with continuing reference to FIGS. 1-3, one or more of the non-energy-storing retarders 310 of an embodiment includes an uncooled retarder. The uncooled retarder may include one or more of an engine or exhaust brake, transmission or other mechanical retarder, electrical retarder, or uncooled friction brake, to name non-limiting examples. The non-energy-storing retarder 310 of an embodiment includes a cooled retarder, such as a friction or service brake having one or more cooling circuits. An uncooled retarder of an embodiment has an uncooled retarder absorption limit 324, as shown in FIG. 4, whereby the uncooled retarder is not capable of absorbing or is not configured to further absorb additional retardation energy. Accordingly, the controller 104 of an embodiment is configured to route the retardation energy to the uncooled retarder up to the uncooled retarder absorption limit before routing additional retardation energy to the cooled retarder. The cooled and uncooled retarder(s) dissipates energy to the atmosphere as heat, while the energy storage device 120 absorbs and stores the retardation energy.

The system 300 of an embodiment gives priority to the uncooled retarder as compared to the cooled retarder for one or more reasons in particular embodiments. The cooled retarder may include wear items, such as wearable service brake pads in a non-limiting example, such that service and maintenance of the vehicle 100 is reduced with reduced use of cooled retarder(s). Further, operation of the cooled retarder(s) may require energy such that overall system energy usage may be reduced with reduced use of the cooled retarder(s).

In the system 300 having a second non-energy-storing retarder, the controller 104 is configured to route a third portion of the retardation energy to the second non-energy-storing retarder. In embodiments having a third non-energy-storing retarder, the controller 104 is configured to route a fourth portion of the retardation energy to the third non-energy-storing retarder.

Figure 5:
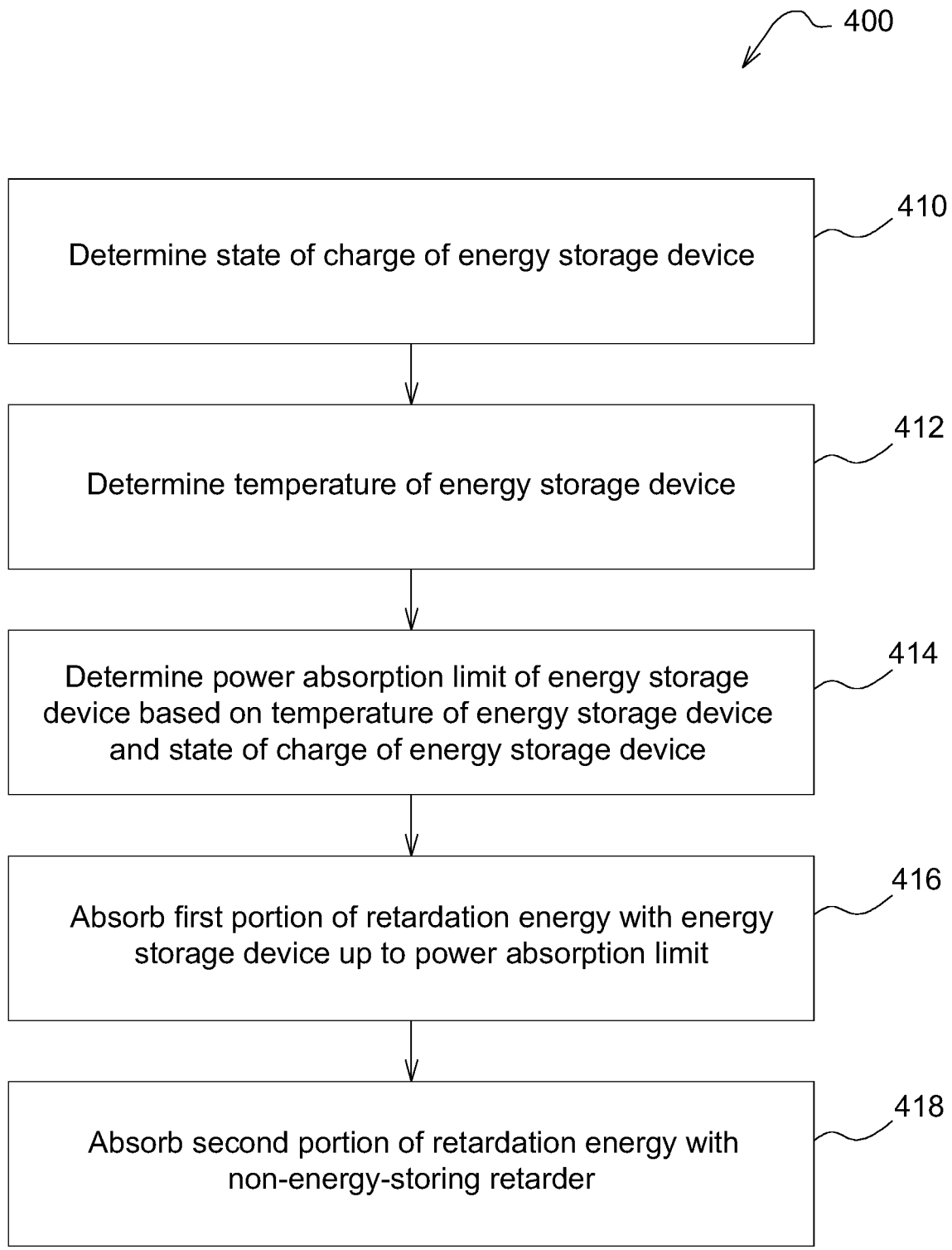
FIG. 5 illustrates a method of controlling retardation energy of a vehicle in accordance with an embodiment of the present disclosure.

Referring now to FIG. 5, the present disclosure further includes a method 400 of controlling the retardation energy of the vehicle 100. The method 400 includes determining, at step 410, the state of charge 122 of the energy storage device 120 of the vehicle 100. The method 400 further includes determining, at step 412, the temperature 124 of the energy storage device 120 of the vehicle 100. The method 400 further includes determining, at step 414, the power absorption limit 126 of the energy storage device 120 based on the temperature 124 of the energy storage device 120 and the state of charge 122 of the energy storage device 120. The method 400 further includes absorbing, at step 416, the first portion 320 of the retardation energy with the energy storage device 120 up to the power absorption limit 126. The method 400 further includes absorbing, at step 418, the second portion 322 of the retardation energy with the non-energy-storing retarder 310.

The method 400 of additional embodiments includes absorbing the second portion of the retardation energy with an uncooled retarder. The method 400 of additional embodiments includes absorbing the second portion of the retardation energy with an engine brake, a transmission retarder, an electrical retarder, and/or a friction brake. Absorbing the second portion of the retardation energy with the uncooled retarder, in particular embodiments, includes absorbing the second portion of the retardation energy with the uncooled retarder up to an uncooled retarder absorption limit. The method 400 of an embodiment further includes absorbing a third portion of the retardation energy with a second non-energy-storing retarder. Absorbing the third portion of the retardation energy with the second non-energy-storing retarder includes absorbing the third portion of the retardation energy with a cooled retardation device in an embodiment. Absorbing the third portion of the retardation energy with the cooled retardation device includes absorbing the third portion of the retardation energy with a friction brake in an embodiment. The method 400 includes prioritizing absorption of the retardation energy of the vehicle in the order of the energy storage device, the non-energy-storing retarder, and the second non-energy-storing retarder in an embodiment. The method 400 further includes determining the retardation energy as a desired retardation of the vehicle 100 during movement of the vehicle 100.

Without in any way limiting the scope, interpretation, or application of the claims appearing below, it will be appreciated that the vehicle 100, the system 300, the controller 104, and method 400 of the embodiments of the present disclosure allow at least a portion of the retardation energy absorbed by the vehicle 100 during descent or another speed control event of the vehicle 100 to be stored and later discharged for vehicle propulsion or other use, attachment or implement use, or other use. Further, the vehicle 100, the system 300, the controller, and the method 400 allow use of the energy storage device(s) 120 with the non-energy-storing retarder(s) 310 to reduce likelihood that the operator observes sudden changes in the retardation behavior of the vehicle 100. Even further, the vehicle 100, the system 300, the controller, and the method 400 increase the efficiency and durability of the vehicle 100 by giving priority to storing the retardation energy in the energy storage device(s) 120 over wasting the energy through use of the non-energy-storing retarder(s) 310. Similarly, the vehicle 100, the system 300, the controller, and the method 400 further improve efficiency and durability and reduce wear on vehicle components by giving priority to uncooled retarder(s) 310 over utilization of cooled retarder(s) and utilizing the maximum retardation power available from uncooled retarder(s) 310.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A speed control system to control retardation energy of a vehicle, the system comprising:
    an energy storage device configured to absorb and store the retardation energy of the vehicle and having a power absorption limit determined at least partially by a temperature and a state of charge of the energy storage device;
    a non-energy-storing retarder configured to absorb the retardation energy of the vehicle; and
    a controller configured to route the retardation energy to the energy storage device up to the power absorption limit and route a remaining portion of the retardation energy to the non-energy-storing retarder;
    wherein the non-energy-storing retarder comprises an uncooled retarder;
    wherein the uncooled retarder has an uncooled retarder absorption limit, the controller configured to route the retardation energy to the uncooled retarder up to the uncooled retarder absorption limit.

2. The system of claim 1, wherein the uncooled retarder comprises at least one of an engine brake and an electrical retarder.

3. The system of claim 1, further comprising a second non-energy-storing retarder configured to absorb the retardation energy of the vehicle, the controller further configured to route a third portion of the retardation energy to the second non-energy-storing retarder.

4. The system of claim 3, wherein the second non-energy-storing retarder comprises a cooled retardation device.

5. The system of claim 4, wherein the cooled retardation device comprises at least one of a transmission retarder and a friction brake.

6. The system of claim 3, wherein the controller is configured to prioritize absorption of the retardation energy of the vehicle by routing the retardation energy in the order of the energy storage device, the non-energy-storing retarder, and the second non-energy-storing retarder.

7. A method of controlling retardation energy of a vehicle, the method comprising:
    determining a state of charge of an energy storage device of the vehicle;
    determining a temperature of the energy storage device of the vehicle;
    determining a power absorption limit of the energy storage device based on the temperature of the energy storage device and the state of charge of the energy storage device;
    absorbing a first portion of the retardation energy with the energy storage device up to the power absorption limit; and
    absorbing a second portion of the retardation energy with a non-energy-storing retarder;
    wherein absorbing the second portion of the retardation energy comprises absorbing the second portion of the retardation energy with an uncooled retarder;
    wherein absorbing the second portion of the retardation energy with the uncooled retarder comprises absorbing the second portion of the retardation energy with the uncooled retarder up to an uncooled retarder absorption limit.

8. The method of claim 7, wherein absorbing the second portion of the retardation energy with the uncooled retarder comprises absorbing the second portion of the retardation energy with at least one of an engine brake and an electrical retarder.

9. The method of claim 7, further comprising absorbing a third portion of the retardation energy with a second non-energy-storing retarder.

10. The method of claim 9, wherein absorbing the third portion of the retardation energy with the second non-energy-storing retarder comprises absorbing the third portion of the retardation energy with a cooled retardation device.

11. The method of claim 10, wherein absorbing the third portion of the retardation energy with the cooled retardation device comprises absorbing the third portion of the retardation energy with at least one of a transmission retarder and a friction brake.

12. The method of claim 9, further comprising prioritizing absorption of the retardation energy of the vehicle in the order of the energy storage device, the non-energy-storing retarder, and the second non-energy-storing retarder.

13. The method of claim 7, further comprising determining the retardation energy as a desired retardation of the vehicle during movement of the vehicle.

14. An energy control system to control retardation energy of a vehicle, the system comprising:
    an energy storage device configured to absorb and store the retardation energy of the vehicle and having a power absorption limit determined at least partially by a temperature and a state of charge of the energy storage device;
    a first non-energy-storing retarder configured to absorb the retardation energy of the vehicle;
    a second non-energy-storing retarder configured to absorb the retardation energy of the vehicle, the controller further configured to route a third portion of the retardation energy to the second non-energy-storing retarder; and a controller configured to first route a first portion of the retardation energy to the energy storage device up to the power absorption limit, then route a second portion of the retardation energy to the first non-energy-storing retarder, then route a third portion of the retardation energy to the second non-energy-storing retarder.

15. The system of claim 14, wherein the first non-energy-storing retarder comprises an uncooled retarder.

16. The system of claim 15, wherein the uncooled retarder comprises at least one of an engine brake and an electrical retarder.

17. The system of claim 15, wherein the uncooled retarder has an uncooled retarder absorption limit, the controller configured to route the second portion of the retardation energy to the uncooled retarder up to the uncooled retarder absorption limit.

18. The system of claim 14, wherein the second non-energy-storing retarder comprises a cooled retardation device.

19. The system of claim 18, wherein the cooled retardation device comprises at least one of a transmission retarder and a friction brake.

* * * * *